United States Patent Office 3,382,013
Patented May 7, 1968

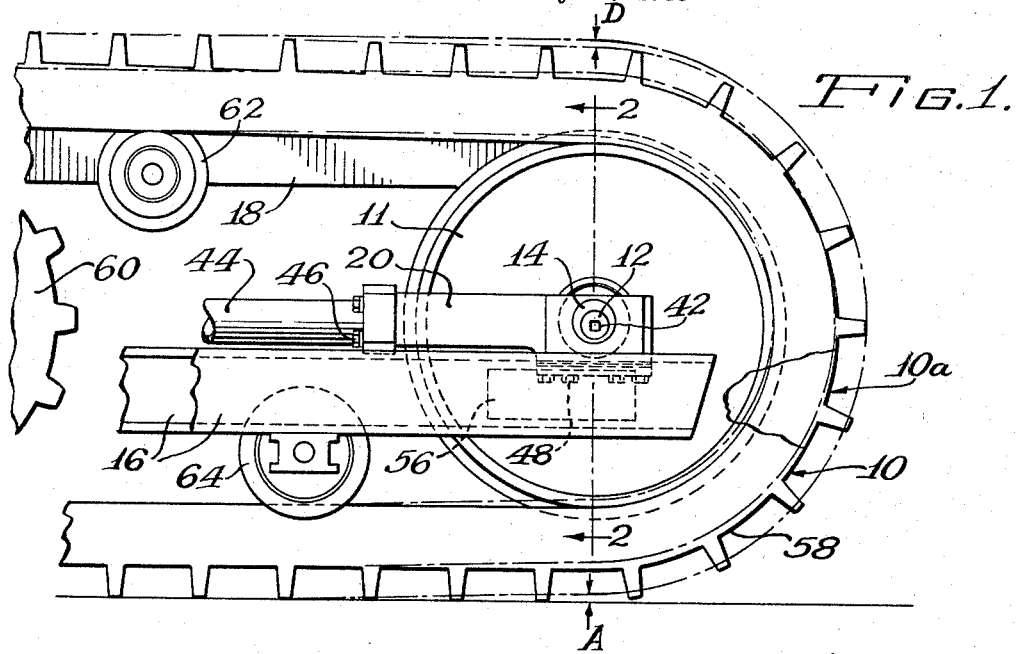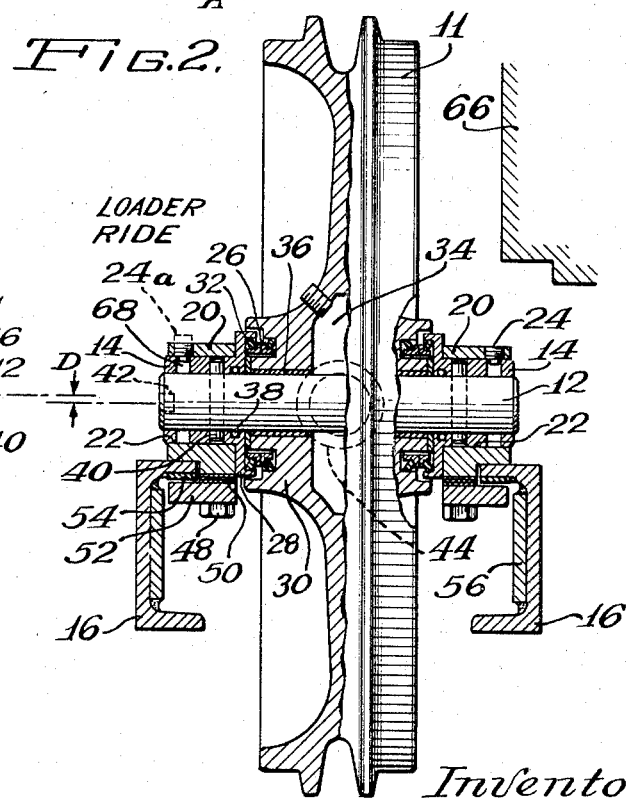

3,382,013
IDLER HEIGHT ADJUSTER FOR TRACTORS
Louis C. Toth, Mount Prospect, and Robert W. Johnson, Winfield, Ill., assignors to International Harvester Company, Chicago, Ill., a corporation of Delaware
Filed July 14, 1966, Ser. No. 565,233
13 Claims. (Cl. 305—30)

ABSTRACT OF THE DISCLOSURE

Front idler wheel structure for track type tractors having a vertical adjuster. The structure includes a front idler wheel over which an endless track chain is trained, a fixed axle on which the wheel is journalled, two eccentrics carried one at each end of the axle, two fixed bearings disposed one at each end of the axle and each engaging the eccentric at that end, a tool-engaging hole by which the axle is rotated into a selected angular setting, a pin connecting the axle and each eccentric to rotate the eccentrics correspondingly and set the selected wheel height, and set screws to interengage the bearings and eccentrics for locking the axle after the wheel height setting is selected.

---

Our invention relates to an idler height adjuster for tractors. The adjuster does not necessitate demounting or being taken apart as comparable prior art mechanisms have sometimes required in order to be adjusted on a tractor, as will presently be explained under the subhead adjustment.

In the drawings:

FIGURE 1 is a right side elevational view of the front suspension portion of a track type tractor embodying the present invention;

FIGURE 2 is a front elevational view in cross section taken along the line II—II of FIGURE 1 to show the wheel-lower adjustment; and FIGURE 3 is like FIGURE 2, but is fragmentary and shows the wheel-raise adjustment.

In a crawler tractor front suspension equipped with our idler height adjuster and as indicated in general at 10 in the accompanying drawing, a longitudinally oriented front idler wheel 11 is rotatably carried on a portion of a transversely disposed axle shaft 12 intermediate the ends thereof, and the shaft 12 non-rotatably carries two eccentrics 14 disposed one at each of such ends.

Two forwardly extending, fixed, supporting beams 16 in a track frame 18, and also two forwardly extending portions of a supported idler fork 20 are likewise disposed one at each end of the shaft. Each such fork portion has a horizontal bearing 22 in which the eccentric at that end is fixed by an Allen head set screw 24.

Adjustment

The desired idler elevation or height adjustment is accomplished first by partial retraction, into the broken line position 24a, of the set screws from the locked position, second by rotation of the shaft and eccentrics to the selectively high or low position as shown in FIGURE 2 or 3, respectively, and third by restoration of the set screws to their locked position as shown in solid lines. The practical importance is apparent, and in this simplicity of adjustment lies one of the primary features of our invention. Comparable structures hitherto have generally, if not always, required that something be taken apart, but no disassembly or unbolting to adjust the wheel height hereof above ground is necessary or desirable.

Seal

A wheel seal comprises a pair of floatingly supported face seal members collectively indicated at 26 and received at one side in the recess of a coaxial cup 28 presented by the eccentric 14, and received at the other side in an annular, axially extending recess formed in the coaxial hub 30 of the idler wheel 11. An elastomeric back-up ring 32, shaped like a Belleville washer, is compressed between each seal member 26 of a pair and the receiving recess and floatingly supports that member of the pair so that the two seal members are in concentric and coplanar, face sealing engagement.

Axle

Viewed beginning at the center section of the wheel axle shaft 12 which occupies a lubricant cavity 34 in the wheel 11, the shaft is seen to pass through a bearing 36 carried by the wheel, past an O-ring 38 carried by the shaft, past an axle pin 40 lodged in a transverse bore in the axle shaft, and thence through the eccentric 14 to a point where the end of the shaft projects slightly beyond the corresponding end of the eccentric. A tool fitting, non-circular, recess 42, having a square shape in cross-section as illustrated, is formed in the end of the shaft 12 so as to be on the outer side of the track frame 18. The tool is a height adjusting tool, not shown, and insertion in the recess and rotation thereof causes the shaft 12, both eccentrics 14, and both eccentric cups 28 to raise or lower the wheel 11, but without disturbing the operative association of the concentric and coplanar members 26 in the seal. Torque is transmitted by the axle pins 40 which extend so that the opposite ends are each disposed in one radial hole of an eccentric 14.

Fork connections

At the rear, a cross plate of the fork 20 is secured to a tubular push beam 44 and the assembly is held together by bolts 46. Each forwardly extending portion of the fork 20 carries bolts 48 and shims 50 by which it adjustably supports a lug plate 52. Each lug plate 52 projects laterally inside of the adjacent beam 16 so as to confront an undersurface thereof having a metal wear plate 54 secured thereto. Changing of the wheel elevation is independent of, and does not require readjustment of, the thickness of the shims 50.

Each beam 16 has a doubler plate 56 welded therein and transfers the weight of the front corner of the tractor to the wheel 11 through the intermediary of the front portions of the fork 20.

Track

An endless, metal, track chain assembly 58 is trained at the front over the idler wheel 11 and at the rear over an engine powered drive sprocket 60. The upper flight of the track is supported on an upper idler 62 carried by the frame 18 and the lower flight engages a series of track rollers which are carried by the frame beams 16 and one of which is indicated at 64.

Only the front suspension 10 and track assembly 58 on the right side of the vehicle are completely shown, but an identical front suspension 10a (FIGURE 1) and track assembly are provided on the left side of the crawler vehicle 66 (FIGURE 2).

*Ride*

From the loader ride position shown in FIGURES 1 and 2 in which each set screw 24 engages an apogee hole 68 in the adjacent eccentric 14, the wheels of the front suspensions 10 and 10a are adjusted into a raised position for smooth ride wherein each set screw 24 engages a diametrically opposed perigee opening 70 in the associated eccentric 14. The change of elevation is indicated at D, causing the tracks 58 at the front to incline upwardly at an angle A (FIGURE 1). Then when the grousers on each assembly 58 strike the ground, particularly hard ground, they will not pound abruptly against the front idler wheel and both mechanical wear and discomfort are reduced. The total height increase can be comparatively small and yet have pronounced results in softening the ride, as evidenced by D equalling only 0.180 inch in one physically constructed embodiment of the invention.

When the adjustment is changed so that the set screws 24 are each received in the companion apogee holes 68 in the eccentrics, the portion of the track assembly in each lower flight lies substantially flat on the ground between the roller 64 and the idler wheel 11, the corresponding value of the angle of inclination A being reduced to zero. In that adjustment, the front end of the tractor can readily carry a loader bucket, without allowing the front end of the tractor to pivot downwardly about the roller 64 so as to cause slight mechanical instability and an uncomfortable ride during loading work.

The tractor is steered by driving in conventional way, i.e., by appropriate clutch and brake control causing the drive sprockets and track assemblies 58 to run at the same or at differing speeds in the forward and/or reverse direction.

What is claimed is:

1. In a height adjuster for the track-carrying wheel of a crawler vehicle having a longitudinal axis of movement:
    a transversely disposed, wheel axle shaft carrying said wheel thereon and also carrying an eccentric on an end of the wheel axle;
    a supported, horizontal bearing at that end accepting the eccentric;
    means fixing the eccentric in said bearing at selected angles of relative rotation fixing the wheel axle at different adjusted height settings desired; and
    wheel sealing means (26) between the eccentric and wheel which when operatively associated therewith establishes a concentric and coplanar sealing engagement, the aforesaid eccentric on the axle end being pinned thereon against relative turning and sliding so as to prevent disturbing the operative association of the wheel sealing means as described.

2. The invention of claim 1, further characterized by means (42) for rotating the eccentric to set the axle at the height desired.

3. The invention of claim 2, the fixing means characterized by:
    diametrically opposed means in the eccentric at the perigee and apogee, respectively, relative to the wheel axle; and
    set screw means (24) in the bearing selectively engaging the apogee means when the axle reaches a far elevation from, and engaging the perigee means when the axle reaches a near elevation to, the set screw means.

4. The invention of claim 1, the wheel sealing means on the wheel side and on the eccentric side characterized by:
    two floatingly supported, face type, companion seal members, a recess on each side receiving the seal member at that side, and an elastomeric back-up ring between each seal member and receiving recess and floatingly supporting the member in concentric and coplanar engagement with the companion seal member.

5. The invention of claim 4, characterized by:
    the recess of an eccentric being concentric to the axle, and the eccentric being eccentric to the recess and the axle.

6. In the front wheel suspension provided in a crawler vehicle and adapting it for movement in a longitudinal direction:
    a track frame having two transversely spaced-apart, longitudinal beams;
    a transversely disposed wheel axle shaft in the frame, said front wheel being carried by the axle shaft intermediate the ends thereof;
    two eccentrics on the wheel axle carried one at each of the ends thereof;
    a wheel fork supported on the longitudinal beams for slidably supporting the wheel axle thereon, said fork having spaced-apart longitudinal front portions;
    two bearing means which are in the longitudinal front portions of the fork, and which are located in registry with one another, with one at each end of the wheel axle and receiving the eccentric carried at that end;
    means for rotating the wheel axle and eccentrics setting the wheel at different adjusted heights; and
    means (24) fixing the eccentrics in the bearings in a selected angle of relative rotation fixing the height setting.

7. The invention of claim 6, characterized by sets of wheel sealing means which are between the wheel and each eccentric and each of which when operatively associated has a concentric and coplanar sealing engagement, the aforesaid eccentrics on the axle ends being pinned against turning and sliding thereon so that the axle rotating means sets the wheel height above ground equally and simultaneously at both ends of the wheel axle, all without disturbing the operative association of the wheel sealing means as described.

8. The invention of claim 7, the fixing means characterized by:
    separate set screw means each adjustably mounted in a different one of the bearings above the eccentric in such bearing; and
    diametrically opposed receiving means in each eccentric located so that one (70) receives the screw means thereabove as the axle moves into an upper elevation approaching the screw means and one (68) receives the screw means as the axle moves into a lower elevation removed from the screw means.

9. The invention of claim 8, characterized by pushbeam means connected to the fork for advancingly and retractively sliding same on the longitudinal beams.

10. The invention of claim 9, the wheel axle rotating means comprising tool-fitting, non-circular means carried in the axle at one end, enabling the axle to receive a tool and to be turned from that end.

11. The invention of claim 9, in combination with a crawler vehicle characterized by a pair of the track frames at the opposite sides of the vehicle;
    a pair of longitudinally spaced-apart wheels in each frame, the front wheel of each pair comprising a track idler wheel; and
    endless tracks trained one over each pair of wheels;
    the axle rotating means characterized by a tool-receiving, non-circular means in each axle at the end thereof on the outer side of the associated track frame, enabling rotation of each axle and therefore adjustment of the front wheel height above ground, to be effected from the outer sides of the vehicle.

12. The invention of claim 11, the fork front portion at each side of each front wheel having a connection to the adjacent beam at that side characterized by:
    a lug plate (52) disposed in a generally horizontal plane and secured to the fork portion;

an undersurface on the adjacent beam confronting the lug plate; and a beam wear plate (54) between the lug plate and the undersurface of the beam and secured to said undersurface.

13. The invention of claim 7, the wheel sealing means on the wheel side and on the eccentric side characterized by:

two floatingly supported, face type, companion seal members, a recess on each side receiving the seal member at that side; and an elastomeric back-up ring between each seal member and receiving recess and floatingly supporting the member in concentric and coplanar engagement with the companion seal member.

References Cited

UNITED STATES PATENTS

| | | | |
|---|---|---|---|
| 251,689 | 1/1882 | Blundell | 308—62 X |
| 1,580,308 | 4/1926 | Lawson. | |
| 2,511,098 | 6/1950 | Bridwell | 305—30 |
| 2,683,033 | 7/1954 | Ashburn | 308—62 X |
| 3,156,505 | 11/1964 | Hubert | 305—30 |
| 3,275,386 | 9/1966 | Bexten | 305—10 |

RICHARD J. JOHNSON, *Primary Examiner.*